(12) United States Patent
Tressler et al.

(10) Patent No.: US 6,183,192 B1
(45) Date of Patent: Feb. 6, 2001

(54) DURABLE TURBINE NOZZLE

(75) Inventors: Judd D. Tressler, Mason; Glenn H. Nichols, Indian Springs, both of OH (US)

(73) Assignee: General Electric Company, Cincinnati, OH (US)

(*) Notice: Under 35 U.S.C. 154(b), the term of this patent shall be extended for 0 days.

(21) Appl. No.: 09/274,144

(22) Filed: Mar. 22, 1999

(51) Int. Cl.$^7$ .................................................. F01D 9/04
(52) U.S. Cl. .................. 415/115; 415/116; 415/209.2; 415/209.3; 416/95
(58) Field of Search .................................. 415/115, 116, 415/209.2, 209.3, 209.4, 191; 416/96 A, 96 R, 97 R, 95

(56) References Cited

U.S. PATENT DOCUMENTS

| 3,891,348 | 6/1975 | Auxier . |
| 4,183,716 | 1/1980 | Takahara et al. . |
| 5,203,873 | * 4/1993 | Corsmeier et al. ................ 416/96 A |
| 5,207,556 | * 5/1993 | Frederick et al. .................... 415/115 |
| 5,584,654 | * 12/1996 | Schaefer et al. ................. 415/209.3 |
| 5,630,700 | * 5/1997 | Olsen et al. ......................... 415/134 |

* cited by examiner

Primary Examiner—Christopher Verdier
Assistant Examiner—Liam McDowell
(74) Attorney, Agent, or Firm—Andrew C. Hess; Rodney M. Young (57) ABSTRACT

A turbine nozzle includes a plurality of vanes joined at opposite ends to outer and inner bands. The inner band has a forward hook which is segmented to reduce thermal mismatch. And, in additional embodiments the vane includes an impingement baffle having preferential cooling.

19 Claims, 6 Drawing Sheets

DURABLE TURBINE NOZZLE

BACKGROUND OF THE INVENTION

The present invention relates generally to gas turbine engines, and, more specifically, to turbine nozzles therein.

In a gas turbine engine, air is pressurized in a compressor and mixed with fuel and ignited in a combustor for generating hot combustion gases. Energy is extracted from the gases in corresponding turbine stages which power the compressor and produce useful work, such as powering a fan in a turbofan engine for propelling an aircraft in flight, for example.

Since the turbines are bathed in the hot combustion gases during operation, they must be suitably cooled which is typically accomplished by bleeding a portion of the pressurized air from the compressor and channeling it through the turbine components.

A high pressure turbine directly receives gases from the combustor and includes a stator nozzle and a corresponding first stage rotor having a plurality of rotor blades extending radially outwardly from a supporting disk. A second stage nozzle then directs the combustion gases through a corresponding row of rotor blades extending from another rotor disk. The second stage nozzle receives lower temperature combustion gases than the first stage nozzle and therefore has different cooling requirements, which are typically effected in a different manner than that for the first stage nozzle.

Turbine nozzles are designed for durability with extensive lives measured in thousands of hours or thousands of cycles of operation. Such extended life is difficult to achieve since the nozzles are subject to various differential temperatures during operation which create thermal loads and stress therefrom. And, temperature distributions and heat transfer coefficients of the combustion gases channeled through the nozzle vary significantly and increase the complexity of providing corresponding cooling. Suitable nozzle cooling is required to limit thermal stresses and ensure a useful life.

A typical turbine nozzle includes a row of stator vanes joined at radially opposite ends to corresponding outer and inner bands. The bands are typically segmented in the circumferential direction, and include two or more vanes in corresponding sectors. The vane sectors permit differential movement during combustion gas temperature changes for reducing undesirable thermal stress during operation.

The individual vanes are hollow and typically include an impingement baffle therein which is a perforated sheet metal sleeve spaced from the inner surface of the vane cavity for channeling cooling air in impingement jets there against.

This type of turbine nozzle specifically configured for a second stage turbine has enjoyed many years of commercial service in this country. However, these nozzles are beginning to experience distress at high cycle operation which may require their replacement prior to their expected useful life. Nozzle distress is caused by locally high heat transfer coefficients in different regions of the nozzle at which corresponding cooling is limited. Thermal gradients lead to thermal stress, which adversely affect the useful life of the nozzle.

Accordingly, it is desired to uncover the source of high cycle turbine nozzle distress, and improve the nozzle design for increasing nozzle durability and corresponding life.

BRIEF SUMMARY OF THE INVENTION

A turbine nozzle includes a plurality of vanes joined at opposite ends to outer and inner bands. The inner band has a forward hook which is segmented to reduce thermal mismatch. And, in additional embodiments the vane includes an impingement baffle having preferential cooling.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
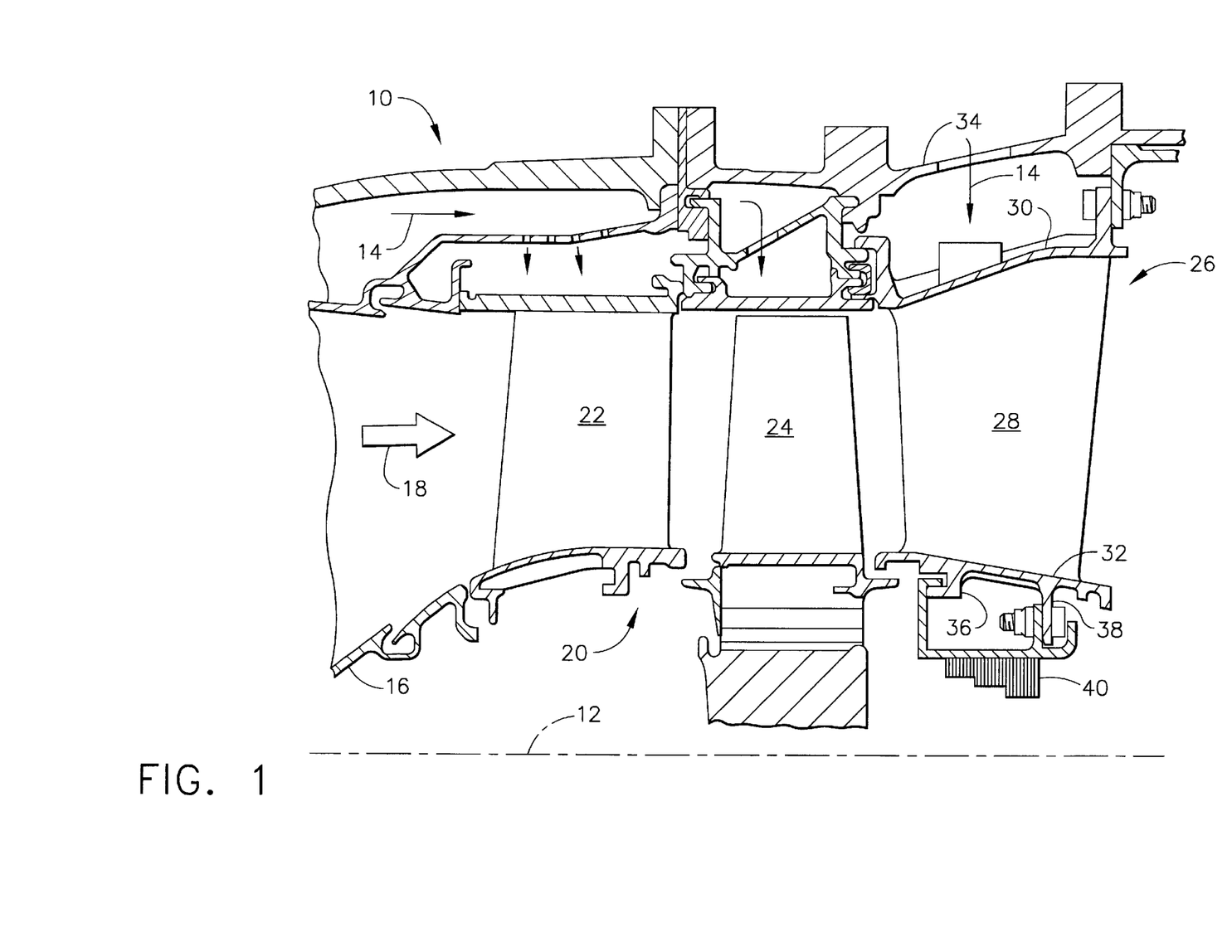
FIG. 1 is an axial, partly sectional view of a turbine region of a gas turbine engine in accordance with an exemplary embodiment of the present invention.

Illustrated in FIG. 1 is a portion of an exemplary aircraft gas turbine engine 10 which is axisymmetrical about a longitudinal or axial centerline axis 12. The engine includes a fan and a multistage compressor (not shown) through which air 14 is pressurized in turn, with the fan air being used for propelling an aircraft in flight, and the air pressurized in the compressor being mixed with fuel and ignited in a combustor 16, only the aft portion thereof being illustrated, for generating hot combustion gases 18 which flow downstream therefrom.

The engine includes a high pressure turbine 20 having a first stage stator nozzle 22 followed in turn by a row of first stage turbine rotor blades 24 extending radially outwardly from a supporting disk. The combustion gases 18 are channeled through the nozzle vanes 22 and blades 24 for powering the compressor in a conventional manner.

Disposed immediately downstream from the first stage blades 24 is a second stage turbine stator or nozzle 26 which in turn channels the combustion gases to a downstream row of second stage turbine rotor blades (not shown) which power the fan in a conventional manner.

But for the improved second stage turbine nozzle 26 illustrated in FIG. 1, the engine 10 is otherwise conventional and is representative of the engine addressed above which has enjoyed many years of commercial use in this country. However, the originally provided second stage nozzle therein has shown signs of distress after a substantial number of hours and cycles of operation short of its expected life. In accordance with the present invention, various sources of that distress have been discovered, and the nozzle being improved for further increasing the useful life thereof.

More specifically, the second stage turbine nozzle 26 illustrated in FIG. 1 includes a plurality of hollow vanes 28 circumferentially spaced apart from each other and integrally joined at opposite radial ends to corresponding outer and inner bands 30,32. The outer band 30 has forward and aft hooks which support the nozzle from a surrounding annular casing 34 in a conventional manner.

The inner band 32 is relatively thin and is locally enlarged at its forward and aft ends for integrally including a forward hook 36 and an aft flange 38 which extend radially inwardly for supporting a honeycomb rotor seal 40 in a conventional manner.

Figure 2:
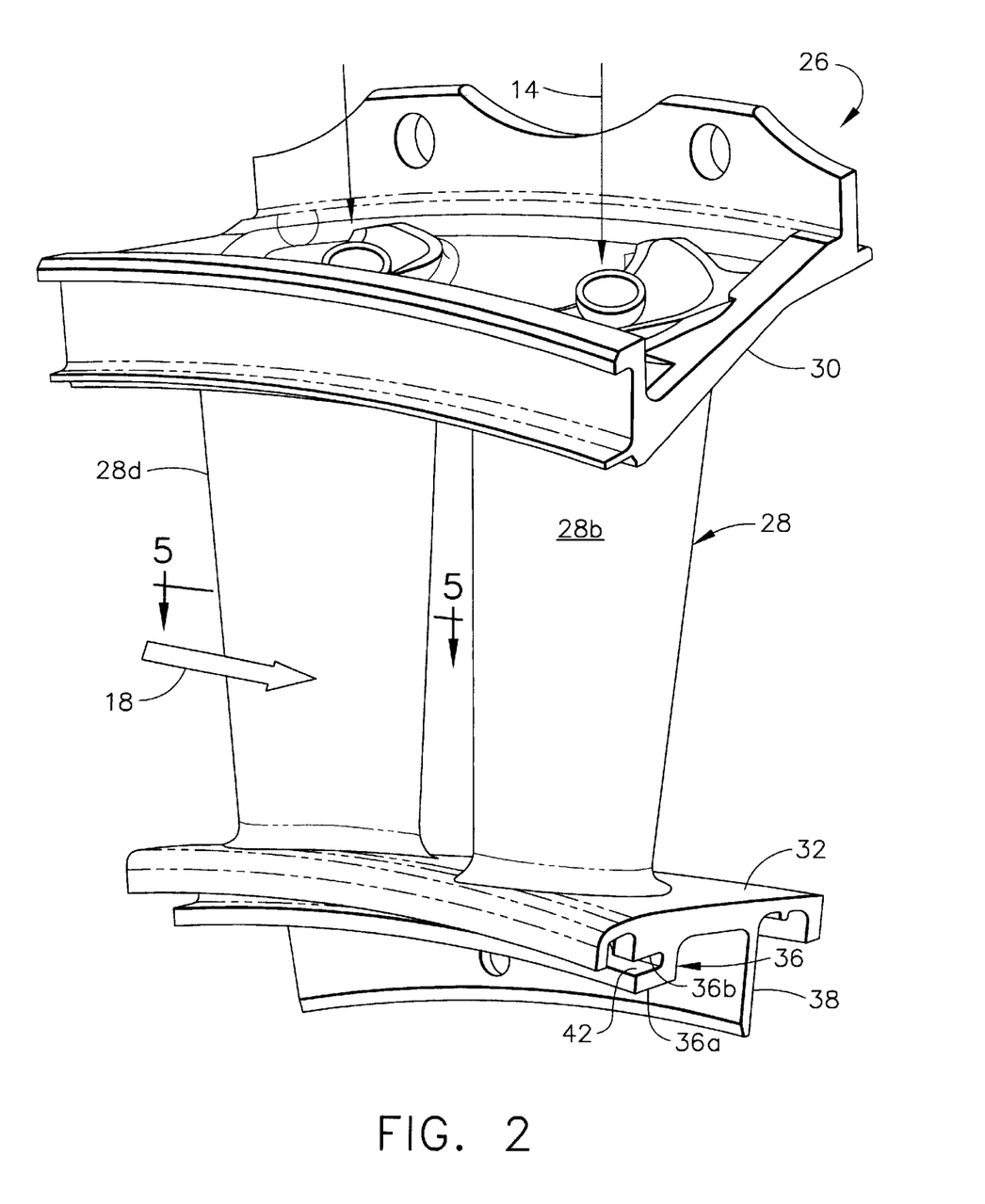
FIG. 2 is an isometric view of a portion of the second stage turbine nozzle illustrated in FIG. 1 in accordance with a preferred embodiment of the present invention.

As illustrated in more particularly in FIG. 2, the nozzle 26 is preferably formed in a plurality of arcuate sectors in which the outer and inner bands 30,32 are arcuate segments integrally formed with two or more vanes 28 in a common casting. The forward hook 36 of the inner band 32 is disposed radially inboard of the leading edge of the inner band and slightly aft therefrom.

The forward hook 36 includes an arcuate inner lip 36a which is circumferentially continuous between its opposite ends, and is spaced radially inwardly from a plurality of circumferentially spaced apart outer lips 36b spaced radially outwardly from the inner lip to define a corresponding retention slot 42 therein. The outer lips 36b are better illustrated in FIG. 3 without the seal 40 illustrated in FIG. 1 supported in the forward hook 36.

The seal 40 illustrated in FIG. 1 includes a sheet metal backing plate from which the honeycomb seal is supported, with the sheet metal being bent in the form of a hook which engages the retention slot 42 in the forward hook 36. The sheet metal hook acts as a fairing to isolate the seal from purge air in this region in a conventional manner.

Instead of being circumferentially continuous like the lower lip 36a, the outer lip 36b is segmented for removing substantial thermal mass from the inner band to reduce or eliminate thermal mismatch between the forward hook and the inner band during transient operation. During such operation, the combustion gases 18 flow over the inner band 32 causing heating thereof. Since the forward hook 36 is hidden below the inner band it is isolated from the combustion gases and therefore has a delayed thermal response. By segmenting only the forward hook outer lip 36b, a significant reduction in thermal mass may be obtained without compromising the performance of the forward hook for supporting the rotor seal 40 in a sealed fit therewith.

Figure 3:
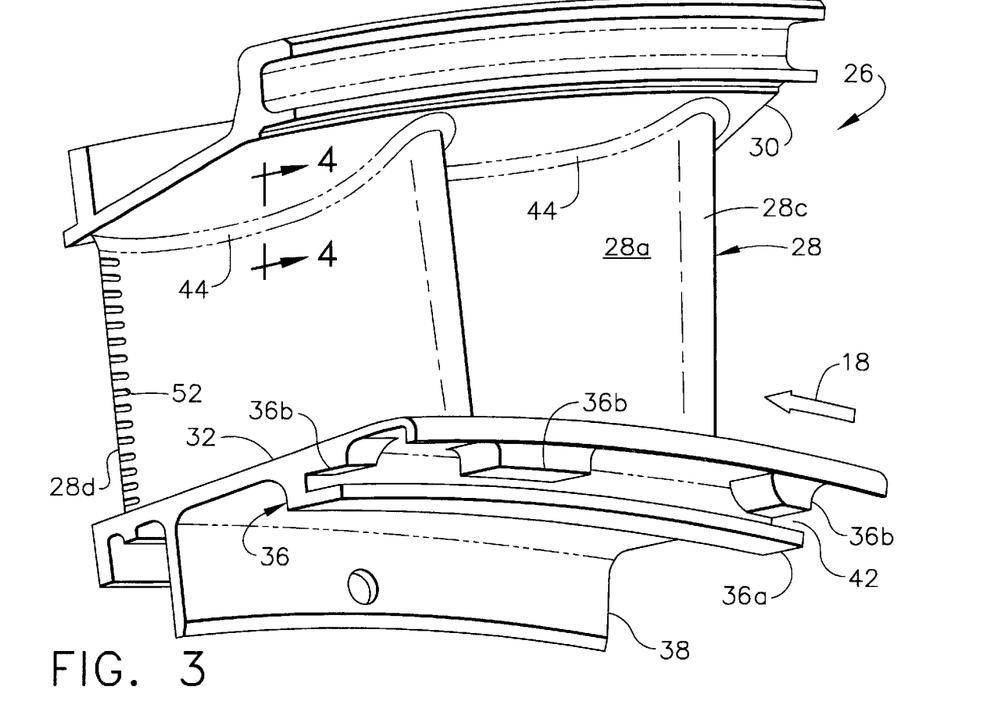
FIG. 3 is an isometric view of the nozzle sector illustrated in FIG. 2 having a segmented forward hook in its inner band in accordance with an exemplary embodiment.

As shown in FIG. 3, three outer lips 36b are provided, with two being disposed at the circumferentially opposite ends of the forward hook, and a single outer lip being disposed intermediate therebetween, preferably midway. In this way, the fairing portion of the rotor seal illustrated in FIG. 1 is continuously supported at its lower surface by the inner lip 36a illustrated in FIG. 3, and is retained at three points defined by the three outer lips 36b on its outer surface. Any thermal distortion in the seal fairing itself during operation is restrained by the three-point retention on its upper surface and the continuous support at its lower surface for maintaining effective performance of the fairing. The reduced thermal mass, however, of the outer lips 36b significantly reduces thermal mismatch in the inner band with a corresponding reduction in thermal stress.

Since the individual vanes 28 are integrally joined to both the outer and inner bands 30,32 as illustrated in FIG. 3, thermal mismatch therebetween during operation causes locally high thermal stresses. In accordance with another embodiment of the present invention, the vanes 28 preferably join the outer band 30 at a compound radii fillet 44 which extends around the outer perimeter of the individual vanes.

Figure 4:
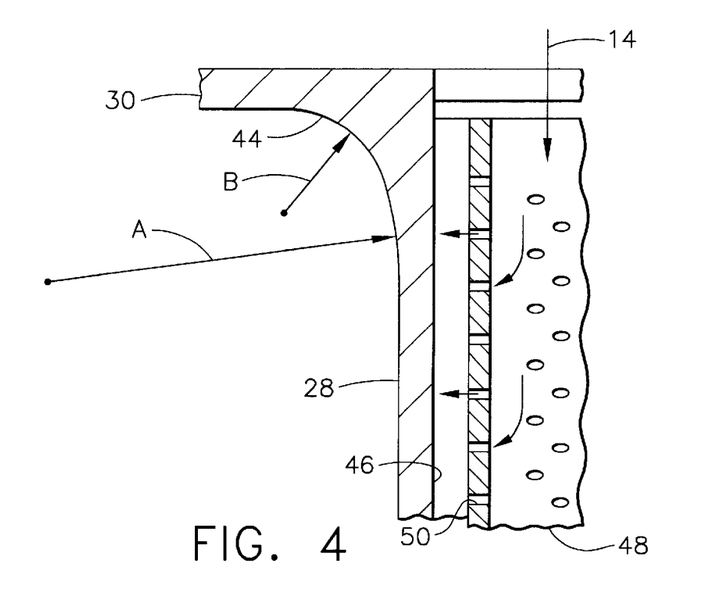
FIG. 4 is a radial sectional view through one of the nozzle vanes and attached outer band having a compound fillet in accordance with another embodiment of the invention.

As shown in more detail in FIG. 4, the fillet 44 preferably has a larger radius A directly adjacent the radially outer end of the vane 28 than adjacent the inner surface of the outer band 30. The large radius A transitions to a smaller radius B in a smooth fillet blending into the inner surface of the outer band. In an exemplary embodiment, the compound fillet is effective for significantly reducing local thermal stress between the vanes and outer band by about 20%. The radially inner ends of the vanes 28 may join the outer surfaces of the inner band 32 with conventional single-radius fillets for acceptable operation, although compound radius fillets may also be used thereat if desired.

As shown in FIGS. 2 and 3, each of the vanes 28 has an aerodynamic airfoil configuration including a generally concave, pressure side 28a and a circumferentially opposite, generally convex, suction side 28b extending axially between leading and trailing edges 28c,d, and radially between the outer and inner bands 30,32 along the radial span thereof.

Figure 5:
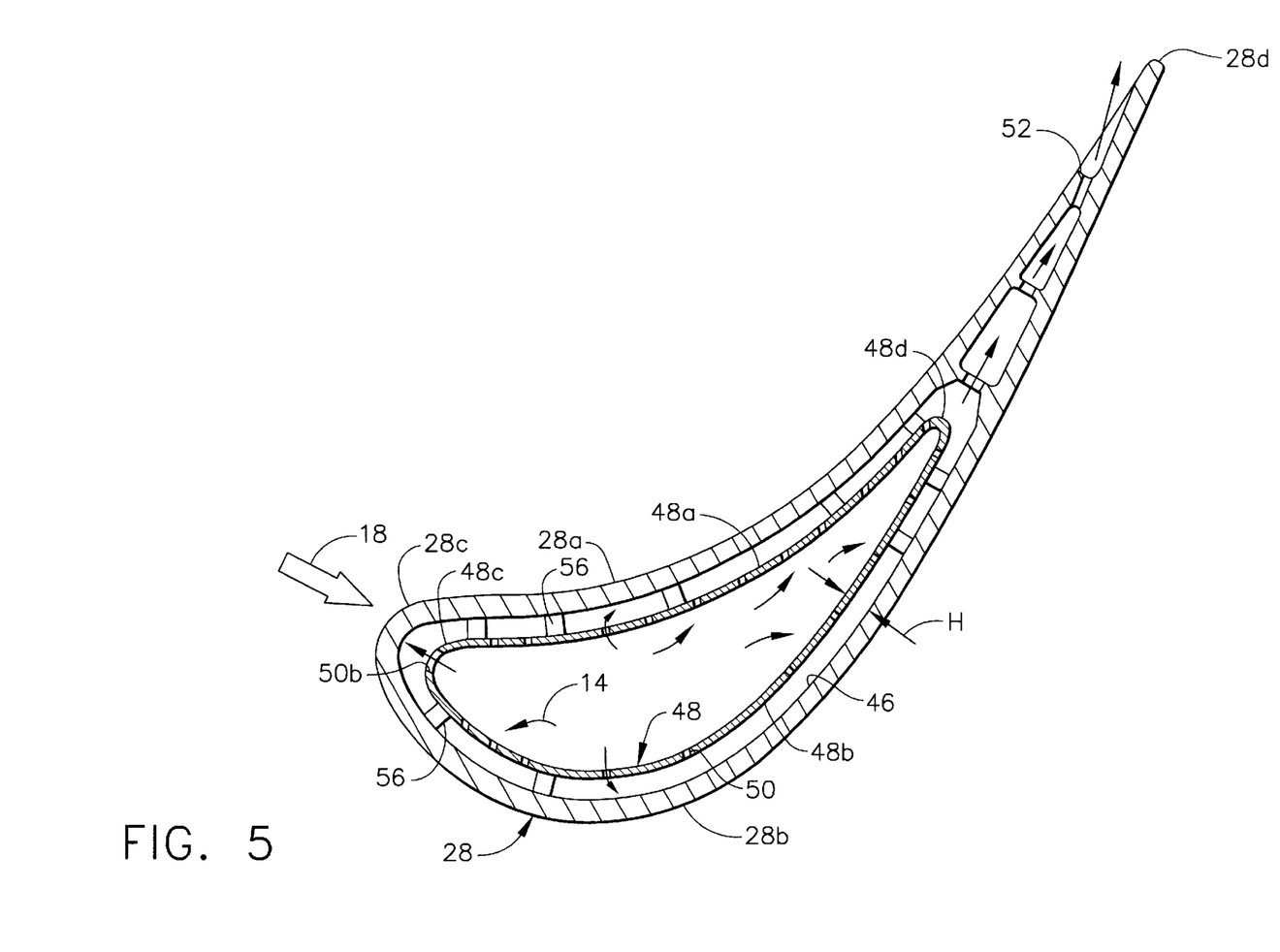
FIG. 5 is a radial sectional view through the midspan of one of the vanes illustrated in FIG. 2 and taken along line 5—5.

As shown in FIGS. 4 and 5, the individual vanes 28 are hollow and defined by thin walls, and include a radially extending cavity 46 therein. Each vane includes a hollow impingement sleeve or baffle 48 having a plurality of spaced apart impingement holes 50 extending through the thin sheet metal wall thereof. The impingement holes 50 are preferably arranged in different patterns facing the inner surface of the vane cavity 46 for preferentially channeling cooling air 14 in impingement jets toward the midspan of the vane.

As shown in FIG. 1, the cooling air 14 is bled from the compressor and suitably channeled through the casing 34 to corresponding inlet apertures in the top of each vane at the outer band 30 in a conventional manner. The cooling air 14 initially flows radially through the inner cavity of the baffle 48 itself, as illustrated in FIGS. 4 and 5, and then turns for discharge through the impingement holes 50 against the inner surface of the vane for impingement cooling thereof.

As shown in FIG. 5, the vane 28 is preferably imperforate over its entire surface except for a row of trailing edge discharge holes 52 which discharge the spent impingement air along the trailing edge 28d of the vane. The vanes are therefore totally internally cooled without otherwise providing film cooling holes therethrough or thermal barrier coating on the external surface of the vane for avoiding the complexity thereof.

Impingement baffles in turbine nozzles are well known in commercial use and typically include impingement holes in uniform patterns on the concave and convex sides thereof. However, in accordance with another embodiment of the present invention, the pattern of the impingement holes 50 on the concave side 48a of the baffle as shown in FIG. 7, corresponding with the pressure side of the vane, is denser than the pattern on the convex side 48b of the baffle as shown in FIG. 6, corresponding with the suction side of the vane, for preferentially cooling the vane midspan.

Figure 6:
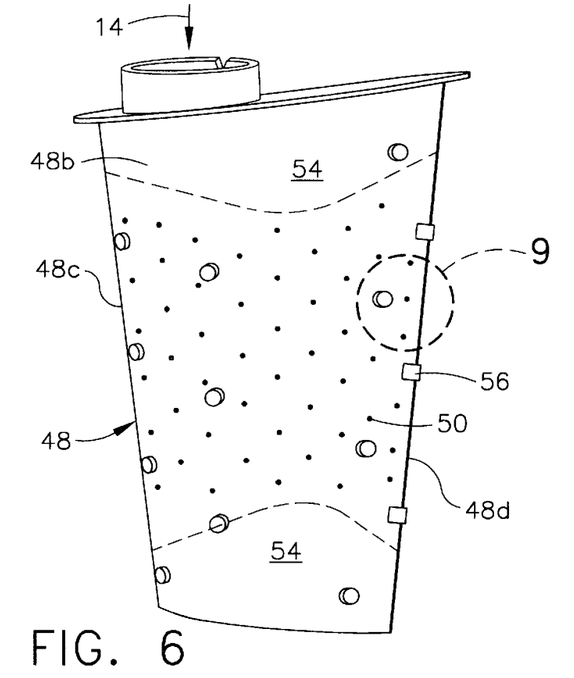
FIG. 6 is an isometric view of the convex side of an impingement baffle contained in the second stage nozzle vanes illustrated in FIGS. 1–5.
Figure 7:
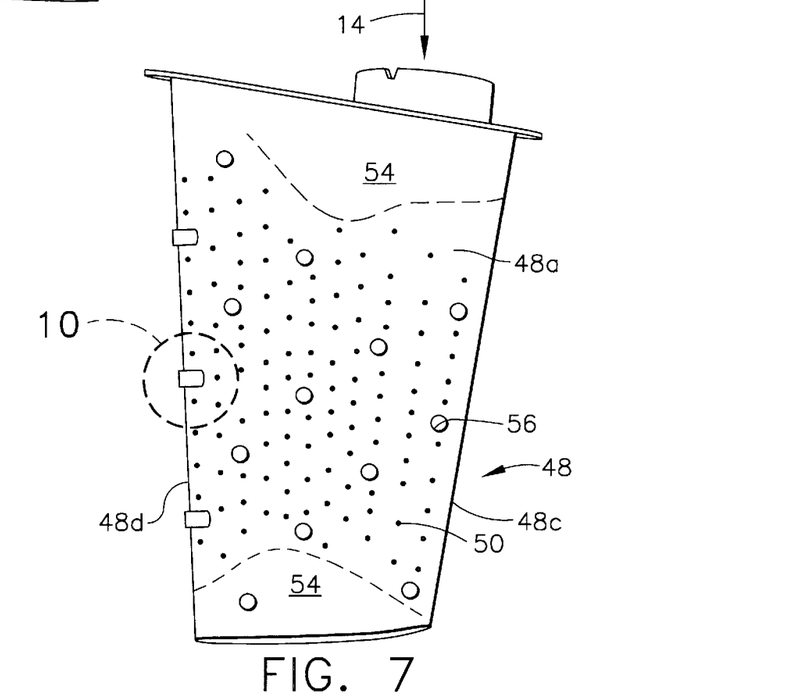
FIG. 7 is an isometric view of the concave side of the impingement baffle illustrated in FIG. 6.

In the preferred embodiment illustrated in FIGS. 6 and 7, the impingement holes 50 on both the concave and convex sides 48a,b of the baffles 48 corresponding with the pressure and suction sides of the vane preferably have an equal size or common diameter C, which may be about twenty mils (0.5 mm) for example.

The baffles 48 preferably include imperforate zones or regions 54 at the radially outer and inner opposite span ends thereof that generally converge toward the baffle midspan between the corresponding leading and trailing edges 48c,d thereof. In this way, the improved baffle 48 may use the same amount of cooling air found in the previous baffle used in commerce, but preferentially distributes the cooling air to the thermally distressed areas near the midspan of the vanes.

Figure 8:
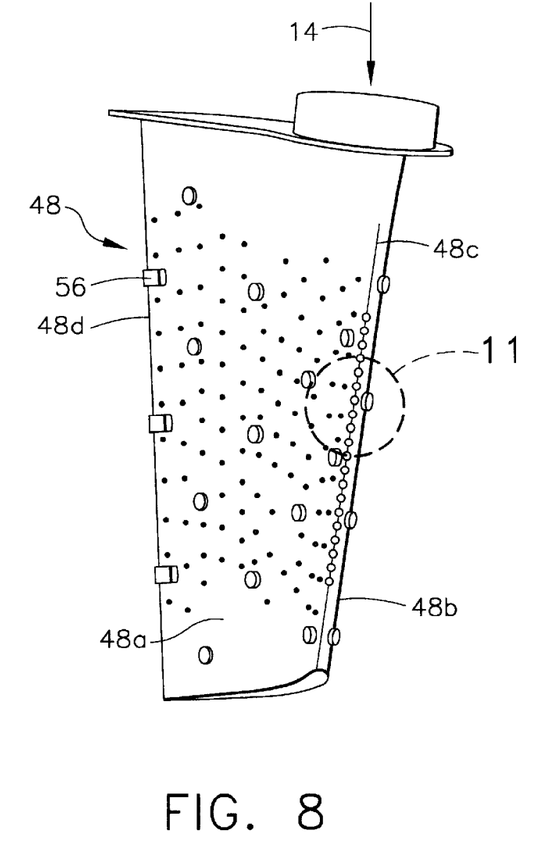
FIG. 8 is an isometric view facing the leading edge of the impingement baffle illustrated in FIGS. 6 and 7.
Figure 11:
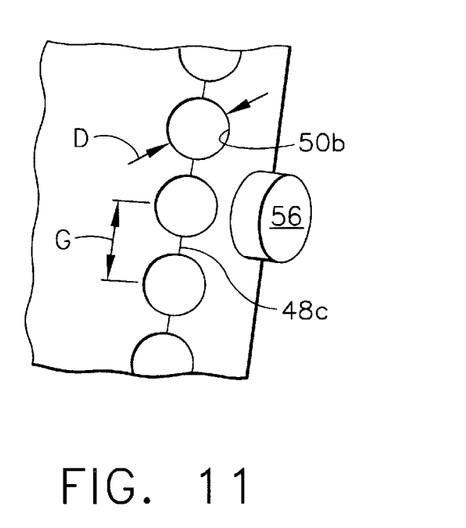
FIG. 11 is an enlarged view of a portion of the baffle illustrated in FIG. 8 within the circle labeled 11.

As shown in FIGS. 5,8 and 11, the baffles 48 preferably also include a row of larger impingement holes 50b extending along the leading edges 48c thereof to preferentially cool each vane behind its leading edge. The large impingement holes 50b illustrated in FIG. 11 have a diameter D which may be about forty mils (1.0 mm) for example which is twice the size of the remaining small impingement holes 50 of diameter C.

Figure 9:
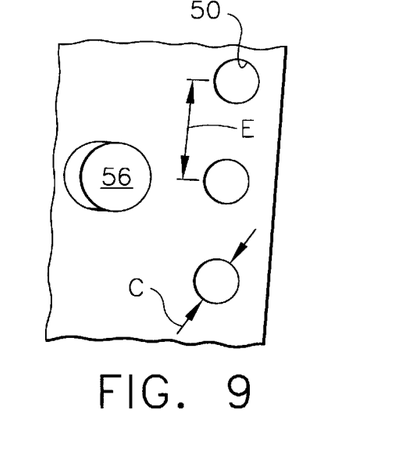
FIG. 9 is an enlarged view of a portion of the baffle illustrated in FIG. 6 within the circle labeled 9.
Figure 10:
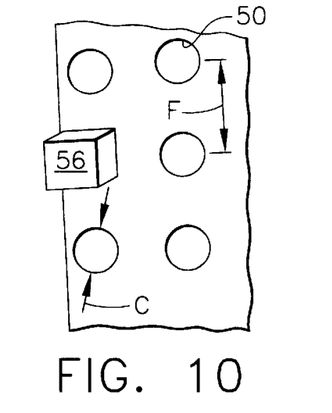
FIG. 10 is an enlarged view of a portion of the baffle illustrated in FIG. 7 within the circle labeled 10.

The impingement holes 50,50b are preferably arranged in patterns having different flow density or flow per unit area for preferentially impingement cooling the different regions of the vanes. As shown in FIGS. 6 and 9, the impingement holes 50 on the convex side 48b of the baffle are spaced apart from each other with a pitch spacing E. Similarly, the impingement holes 50 on the concave side 48a of the baffle illustrated in FIGS. 7 and 10 have a pitch spacing F which is preferably smaller than the convex pitch spacing E for providing increased impingement cooling along the inner surface of the vane pressure side as opposed to the inner surface of the vane suction side.

And, in accordance with another embodiment of the present invention, the large impingement holes 50b along the baffle leading edge have a greater flow density for preferentially cooling the inside of the vane leading edge, as shown in FIG. 5, than on the vane pressure and suction sides. As shown in FIG. 11, the large holes 50b have a corresponding pitch spacing G which permits the use of fewer larger holes 50b than smaller holes along the leading edge for achieving a greater flow density.

It is noted that a given amount of cooling air 14 is provided for each vane and corresponding baffle which must be suitably distributed inside the different regions of the vane. The high density holes on the baffle concave side 48a provide more cooling of the vane pressure side than the lower density impingement holes in the baffle convex side 48b on the vane suction side.

Correspondingly, the high density impingement holes 50b along the baffle leading edge 48c concentrate cooling along the back of the vane leading edge. The increased amount of impingement cooling air provided along the vane leading edge and pressure side is at the expense of a reduced amount on the suction side.

However, by introducing the imperforate regions 54 along both sides of the baffle near the outer and inner ends thereof, additional cooling air is provided for the remaining impingement holes by eliminating impingement cooling in the imperforate regions 54.

As illustrated in FIG. 5, the baffle leading edge 48c has a relatively large radius of curvature sufficient for forming the large impingement holes 50b substantially planar therein, and the vane leading edge 28c has a correspondingly larger radius to complement the baffle leading edge. In a preferred embodiment, the radius of the vane leading edge 28c is about 50% greater than in the previous commercial design for significantly improving the impingement cooling thereof.

Since the combustion gases 18 stagnate at the vane leading edge during operation, they effect a correspondingly high external heat transfer coefficient along the vane leading edge. By increasing the radius of the leading edge, and correspondingly increasing the radius of the baffle leading edge 48c and introducing the large impingement holes 50b therein, a significant increase in the ratio of the cooling area behind the vane leading edge to the heated area outside the vane leading edge is provided, with a corresponding reduction in temperature of the vane leading edge.

FIG. 5 illustrates another embodiment of the present invention wherein the baffle 48 complements the corresponding vane cavity 46 provided therefor for maintaining a substantially uniform spacing or gap H with the inner surface of the vane cavity between the vane leading and trailing edges 28c,d. In this regard, the improved impingement baffle 48 is longer along its chord or camber axis than was previously used in the shallow baffle terminating shorter from both the vane leading and trailing edges.

As shown in FIG. 5, the baffle 48 includes integral standoff pads 56 on its outer surface for spacing the baffle from the opposing inner surface of the vane cavity 46, with the pads being preferably arranged on opposite sides of the baffle at both the leading and trailing edges 48c,d thereof. In this way, both the leading and trailing edges of the baffle may be maintained in precise alignment with the corresponding inner surfaces of the vane for maintaining a substantially uniform gap around the baffle, and in particular at the vane leading edge which requires enhanced cooling thereof.

As shown in FIGS. 6 and 7, the corresponding pads 56 are more uniformly spaced on the baffle concave side 48a, corresponding with the vane pressure side, than on the baffle convex side 48b, corresponding with the vane suction side. In this way, the vane pressure side which experiences a relatively high heat transfer thermal coefficient will enjoy substantially uniform impingement cooling from the inside by the impingement baffle retained in place during operation without significant distortion or movement. Since the vane suction side experiences less heat transfer coefficient on its external surface, fewer pads 56 may be used on the baffle convex side with a wider spacing.

These various improvements described above provide tailored and preferential cooling of the different portions of the nozzle vanes 28 themselves for reducing thermal distress and improving nozzle durability and life. Furthermore, the improved forward hook 36 of the inner band 32 and the compound fillet 44 at the outer band 30 provide significant reductions in local thermal stress and mismatch which further improves the durability and life of the nozzle. The nozzle therefore enjoys decreased metal temperature during operation, a more balanced thermal design, and reduced peak stresses which all directly contribute to increased durability of the nozzle and enhanced life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle for a gas turbine engine, comprising:
a plurality of vanes integrally joined at opposite ends to outer and inner bands; and said inner band having a forward hook inboard of a leading edge thereof, said hook including an inner lip and a plurality of circumferentially spaced apart outer lips spaced radially from said inner lip to define a retention slot therein.

2. A nozzle according to claim 1 wherein said inner band is an arcuate segment, and said outer lips are disposed at opposite circumferential ends thereof and intermediate therebetween.

3. A nozzle according to claim 1 wherein said vanes join said outer band at a compound radii fillet.

4. A nozzle according to claim 3 wherein said fillet has a larger radius adjacent said vane than adjacent said outer bands.

5. A nozzle according to claim 1 wherein:

said vanes have a generally concave, pressure side and an opposite, generally convex, suction side extending between leading and trailing edges and between said outer and inner bands along respective spans of said vanes; and said vanes include cavities having an impingement baffle, and said baffles have a plurality of spaced apart impingement holes extending therethrough and arranged in different patterns facing an inner surface of said cavities for preferentially channeling cooling air in impingement jets toward midspan of said vanes.

6. A nozzle according to claim 5 wherein said impingement hole pattern on said vane pressure side is denser than said pattern on said vane suction side for preferentially cooling said vane midspan.

7. A nozzle according to claim 6 wherein said baffles include imperforate regions at opposite span ends thereof that converge toward said midspan between said leading and trailing edges thereof.

8. A nozzle according to claim 7 wherein:

said impingement holes on said pressure and suction sides have equal size; and said baffles include a row of larger impingement holes extending along leading edges thereof.

9. A nozzle according to claim 5 wherein said baffles include a row of larger impingement holes extending along leading edges thereof.

10. A nozzle according to claim 9 wherein said impingement holes have a greater flow density inside said vane leading edge than on said vane pressure and suction sides.

11. A nozzle according to claim 9 wherein said baffle leading edge has a radius sufficient for forming said large impingement holes planar therein, and said vane leading edge has a correspondingly larger radius to complement said baffle leading edge.

12. A nozzle according to claim 5 wherein said baffles complement said vane cavities for maintaining a uniform gap with said inner surfaces thereof between said vane leading and trailing edges.

13. A nozzle according to claim 5 wherein said baffles include integral standoff pads for spacing said baffles from said vane inner surfaces, and said pads are arranged on opposite sides of said baffles at both leading and trailing edges thereof.

14. A nozzle according to claim 13 wherein said pads are more uniformly spaced on said vane pressure side said than said suction side.

15. A turbine nozzle for a gas turbine engine, comprising:

a plurality of vanes integrally joined at opposite ends to outer and inner bands;

said inner band having a forward hook inboard of a leading edge thereof, said hook including an inner lip and a plurality of circumferentially spaced apart outer lips spaced radially from said inner lip to define a retention slot therein;

said vanes have generally concave, pressure sides and opposite, generally convex, suction sides extending between leading and trailing edges thereof and between said outer and inner bands along respective spans of said vanes; and said vanes include cavities each having an impingement baffle, and said baffles have a plurality of spaced apart impingement holes extending therethrough and arranged in different patterns facing an inner surface of said cavities for preferentially channeling cooling air in impingement jets toward midspan of said vane.

16. A nozzle according to claim 15 wherein said baffles include imperforate regions at opposite span ends thereof that converge toward said midspan between said leading and trailing edges thereof.

17. A nozzle according to claim 16 wherein said baffles include a row of larger impingement holes extending along leading edges thereof.

18. A nozzle according to claim 17 wherein said inner band is an arcuate segment, and said outer lips are disposed at opposite circumferential ends thereof and intermediate therebetween.

19. A nozzle according to claim 18 wherein said vanes join said outer band at a compound radii fillet.

* * * * *